UNITED STATES PATENT OFFICE.

CHARLES C. HUFFMAN, OF CHICAGO, ILLINOIS, ASSIGNOR TO SUNBEAM CHEMICAL COMPANY, OF CHICAGO, ILLINOIS, A CORPORATION OF ILLINOIS.

UNIVERSAL GRAY DYE AND METHOD OF PRODUCING THE SAME.

1,315,961.  Specification of Letters Patent.  Patented Sept. 16, 1919.

No Drawing.  Application filed July 5, 1918. Serial No. 243,313.

*To all whom it may concern:*

Be it known that I, CHARLES C. HUFFMAN, a citizen of the United States, and resident of Chicago, in the county of Cook and State of Illinois, have discovered a certain new and useful Universal Gray Dye and Method of Producing the Same, of which the following is a specification.

My discovery relates to dyes and particularly to a novel dye soap having peculiar and advantageous qualities.

I am aware that heretofore dyes have been incorporated in soaps with the object in view of providing a simple carrier for the dye and fairly satisfactory results may be secured if neutral dyes are employed and if the water in which the substance is used is of exactly the right temperature.

My improved dye soap should not be confused with those in which the soap acts merely as a carrier or vehicle for the dye, as the following description will show that the final product is the result of peculiar reactions which take place between the dye and the elements of the soap and which product could not be secured by the use of the materials heretofore employed or as heretofore combined. By reason of the novel process of compounding and the selection of substances which enter into the compound, a dye is produced which is equal if not superior to those which require boiling and the addition of a mordant for setting the color.

One of the important distinctions of the dyes produced by me is that they are alkali proof, irrespective of the characteristics of the dye, that is, basic, neutral or acid, before combining in the soap.

A still further distinction is that the dyes are universal that is, adaptable to either cotton, wool, silk or linen, or mixtures thereof.

The composition and the method of preparing it will now be described in detail.

In the following description the proportions of ingredients employed are sufficient to produce twenty-six gross, one ounce bars of the dye soap. To produce this quantity, 20 gallons of a vegetable oil and seven gallons, one quart 42° B.; sodium hydroxid are combined. The oil and caustic soda are mixed until saponification is nearly complete, at which time the dye solution is added. To produce a medium gray I employ thirty-six ounces avoirdupois of pheno-black which is dissolved in thirty fluid ounces of boiling water. The oils employed may be varied. Any of the well known oils such as olive, soy bean, raisin, peanut, etc., may be used separately or combined with cocoanut oil. The proportions of the cocoanut to the other oils will vary according to weather conditions. Normally I employ fifteen gallons of an oil such as soy bean, and five gallons of cocoanut oil to produce the quantity herein specified.

It will be noted that the quantity and strength of the sodium hydroxid are such that there is a slight excess over that actually required for saponification of the oil and this excess acts upon the dye to reform the same.

The subsequent reaction together with the heat of the dye solution further raises the temperature of the mixture. After agitation, until the ingredients are thoroughly combined, the substance is poured into a large mold or frame in which it is allowed to remain from thirty-six to forty-eight hours. A peculiar action is discernible. The substance after being poured seems at first to cool somewhat but after standing for a few hours the temperature rises until in the interior of the large mass it reaches as high as 80° C. This continues for a few hours when the temperature again lowers until the reaction is complete and the substance is at normal temperature. After the mass has cooled to normal temperature it is slabbed and pressed into cake form.

Apparently the reaction which was started when the materials were combined continues and is augmented by the heat of the mass until the transformation or molecular reorganization is complete. The dye which was employed and which is especially adapted to stain everything with which it contacts now has no affinity for nor will it adhere to the hands of the user or to the utensil in which the dying operation is carried out. Nevertheless, the dye has a strong affinity for all fabrics. It requires no boiling nor mordant for setting. It is alkali proof and fast.

In use the soap and the garment or fabric to be dyed are introduced into hot water and the soap is applied directly to the fabric to thoroughly cleanse the same. Even though the soap is applied locally or only in spots the coloring will be even. Furthermore, the hands or container will not be colored. After the article is cleansed and dyed it is rinsed in cold water and dried in the usual manner. The dye will be found to be alkali proof.

One of the most important features of my novel discovery is that the shade of color which is secured in the use of the article is the same whether a large or a small quantity is employed and whether it is used in hot or cold water. It is preferably used with hot water for the reason that the soap will not act to thoroughly cleanse the article unless the water is hot. The effect of deepening the shades by the use of hot water is not present and this is of great importance if it be desired to reproduce certain colors. The ordinary user has no means of determining whether the same temperature is employed in each instance. Neither would he be able to determine whether exactly the same quantity of the dyeing material was employed. By the use of my product the colors may be duplicated with ease and certainty.

Attention is called to the fact that the soap is manufactured by the cold process. By reason of this process of manufacture I am enabled to secure an absolutely uniform product with regard to the colors produced. The low temperatures employed are much more easily controlled and the necessary reaction between the soap and the dye is completed with a certainty which is not possible in a settled soap.

It will be understood, of course, that other saponifying agents may be employed than that specified and also that the oils used may be varied. I have found that a quantity of a mineral oil up to approximately 20% of the total oil may be used to advantage.

I claim:

1. The herein described universal gray dye which is formed by adding dissolved pheno-black to a saponified solution containing an excess of the saponifying agent, substantially as described.

2. A gray dye soap composed of the reaction products of a vegetable oil, an excess of a saponifying agent, and a pheno-black, combined as set forth.

3. The method of producing a universal, alkali proof gray dye combined with soap, which consists in combining an oil and a quantity of a saponifying agent in excess of that required for saponification, then dissolving pheno-black in hot water and adding the dye solution to the saponified solution just before saponification is complete, then thoroughly mixing, and then molding the soap, substantially as described.

4. The method of producing a universal gray dye combined with soap which consists in preparing a solution of vegetable oil and an excess of sodium hydroxid, then dissolving pheno-black in boiling water and adding the same to the soap solution, the heat of the bodies, plus the heat of the subsequent reaction being such as to bring the temperature of the compound to approximately 55° C., then pouring the material, substantially as described.

5. A dye soap formed by combining approximately twenty gallons of a vegetable oil with seven gallons, one quart of sodium hydroxid, 40° B., then adding to the compound just prior to complete saponification, thirty fluid ounces of water in which substantially thirty-six ounces avoirdupois of pheno-black has been dissolved, substantially as described.

Signed at Chicago, in the county of Cook and State of Illinois, this 2nd day of July, 1918.

CHARLES C. HUFFMAN.

Witness:
T. D. BUTLER.